United States Patent [19]

Moorehead

[11] Patent Number: 5,503,515

[45] Date of Patent: Apr. 2, 1996

[54] CONTACT LENS INVERTING APPARATUS AND METHOD

[75] Inventor: Michael Moorehead, Rochester, N.Y.

[73] Assignee: Bausch & Lomb Incorporated, Rochester, N.Y.

[21] Appl. No.: 371,908

[22] Filed: Jan. 12, 1995

[51] Int. Cl.[6] .................................................. B65G 47/252
[52] U.S. Cl. .......................... 414/755; 198/380; 414/786
[58] Field of Search ........................ 198/380; 209/543, 209/932; 406/87; 414/755, 786

[56] References Cited

U.S. PATENT DOCUMENTS

| | | | |
|---|---|---|---|
| 3,307,678 | 3/1967 | McCollough et al. | |
| 3,734,268 | 5/1973 | Burger et al. | |
| 3,874,740 | 4/1975 | Hurd | 302/31 |
| 3,915,609 | 10/1975 | Robinson | 425/174.6 |
| 4,006,563 | 2/1977 | Charlot | 51/109 |
| 4,071,272 | 1/1978 | Drdlik | 294/1 |
| 4,093,062 | 6/1978 | Sjogren | 198/380 |
| 4,172,513 | 10/1979 | Bradstreet | 198/380 |
| 4,273,491 | 6/1981 | Roux | |
| 4,337,633 | 7/1982 | Logue | 72/94 |
| 4,452,350 | 6/1984 | Shields | 198/424 |
| 4,832,716 | 5/1989 | McMichael | 55/467 |
| 4,836,689 | 6/1989 | O'Brien et al. | 374/125 |
| 4,953,343 | 9/1990 | Hellman | 53/500 |
| 5,042,639 | 8/1991 | Guinn et al. | 198/443 |
| 5,197,584 | 3/1993 | Powell et al. | 198/380 |
| 5,272,806 | 12/1993 | Marshall et al. | 29/822 |
| 5,285,566 | 2/1994 | Marshall et al. | 29/783 |
| 5,315,333 | 5/1994 | Nash | 354/202 |
| 5,348,133 | 9/1994 | Powell et al. | 198/380 |

FOREIGN PATENT DOCUMENTS 216203  4/1987  European Pat. Off. ............... 198/380

Primary Examiner—William E. Terrell
Assistant Examiner—Janice L. Krizek
Attorney, Agent, or Firm—Katherine McGuire

[57] ABSTRACT

An apparatus and method for inverting a plurality of contact lenses between separate processing steps which treat the opposite concave and convex surfaces of the lenses. The lenses are initially placed convex side-up on a perforated lens support surface and are subjected to the first processing step which treats this surface of the lens. The support surface is then passed over an elongated air stream which traverses and is directed to impinge upon the bottom surface of the support whereby the air stream passes through the perforations in the support and inverts the lenses from the convex side-up position to a concave side-up position whereupon this surface of the lenses may be treated in a subsequent processing step.

4 Claims, 2 Drawing Sheets

CONTACT LENS INVERTING APPARATUS AND METHOD

BACKGROUND OF THE INVENTION

The present invention relates to material handling apparatus for altering the orientation of an article between different stages of a manufacturing process. More specifically, it relates to an apparatus and method for inverting a plurality of delicate, non-planar work pieces (e.g., contact lenses) between separate manufacturing processing steps which require, for example, sequential processing treatments to the opposite concave-convex surfaces of the lenses.

Small, delicate work pieces such as contact lenses pose a significant handling problem as to the method(s) by which they are moved through multiple stages of a manufacturing process. Since scratched, cracked or broken lenses must be rejected and scrapped, it is highly desirable to develop material handling methods which make minimum direct contact with the lenses so as to reduce the chance of destructive damage thereto. The necessity for total inversion of a lens from one manufacturing processing stage to another may indeed present the greatest material handling challenge for this type of work piece. Total inversion of a contact lens is required, for example, when effecting plasma treatments to the opposite convex and concave surfaces of silicone hydrogel lenses. Heretofore, inversion of contact lenses between plasma treatments to the opposite surfaces of a lens has been effected manually with a pair of tweezers, a laborious process that is expensive, time consuming, and may contribute to worker repetitive motion injuries.

A known material handling apparatus for inverting an ophthalmic lens between manufacturing processing steps is seen in U.S. Pat. No. 4,006,563 issued to Essilor International on Feb. 8, 1977. In the '563 machine, non-planar, ophthalmic mouldings are inverted, one at a time, as they are released from a suction cup mechanism 75 adjacent a tipping rod 83 which extends transversely above a moving conveyor belt. As the moulding is released, the leading edge thereof strikes the tipping rod while the trailing edge falls onto the conveyor belt, with the tipping rod and moving conveyor belt acting together to flip the moulding over onto the belt (ending convex side up). The lens travels to the opposite end of the conveyor belt where it is picked up by a second suction cup mechanism and deposited at a second battery of work stations.

While the '563 machine appears effective at inverting an ophthalmic lens between two batteries of work stations, it would not be an acceptable means for inverting a finished contact lens since the striking of the lens edge against a tipping rod would likely cause destructive damage to the lens resulting in unacceptably high numbers of reject lenses. Furthermore, it is apparent the '563 mechanism can invert only one moulding at a time which makes it inefficient for use in high volume production environments such as the contact lens manufacturing business.

It is also known to use a controlled, compressed air stream in article orienting apparatus. For example, as seen in U.S. Pat. No. 3,734,268 which issued to Burger et al on May 22, 1973, an air stream is used to flip any lids which are in a "down skirt" position traveling along a conveyor belt 18 to an "upskirt" position. (The term "down skin" means the hollow of the lid formed by the circular flat portion and circumscribing vertical wall ("skin") is facing downwardly on the belt. "Up skirt" means the hollow is facing upwardly on the belt.) The air stream 48 is directed upwardly through an opening 38 formed in a horizontal shelf 36 over which belt 18 extends. Laterally and longitudinally spaced curved walls 34 and 52 located on opposite sides of belt 18 direct the lids, one at a time, into a position where a side edge of each passing lid (facing wall 52) slightly overhangs the corresponding side edge of the belt. With the opening 38 in the underlying shelf 36 being located outwardly adjacent to this edge of the belt, the air stream is directed to impinge against the downwardly facing surface of the overhanging portion of the lid. Thus, lids in the "down skirt" position will be flipped over in a lateral direction to an "up skin" position by the air stream due to the forces acting against the hollow of the lid. Apparently, lids already in the "up skirt" position are not affected by the air stream.

While the '268 device appears suitable for inverting durable plastic lids as they travel down a conveyor belt, it would not be an acceptable method for inverting very delicate articles such as contact lenses since a lens edge would likely be damaged as it is forced into the correct position by the wall members 34 and 52. Additionally, the '268 mechanism does not provide for the orientation of more than one article at a time, a desirable feature in high volume production environments such as the contact lens manufacturing business.

There thus exists a need for an inexpensive, reliable and safe apparatus and method for inverting a plurality of contact lenses as they are transferred from one manufacturing process step to another, while also maintaining an acceptable scrap ratio caused by the material handling method.

SUMMARY OF THE INVENTION

The present invention addresses the above needs and concerns by providing a novel and unique apparatus and method for inverting a plurality of contact lenses between separate processing steps which is extremely simple to implement and operate.

More specifically, a plurality of lenses are first placed convex side up on a planar support surface such as a tray. The tray includes a plurality of small, spaced perforations having diameters substantially smaller than any one of the lenses. The upwardly facing, convex surfaces of the lenses are then treated as needed. For example, the tray may be placed in a plasma chamber where the convex surfaces of the lens are treated to increase the hydrophilic properties thereof in a known manner. The tray with treated lenses still positioned thereon is then removed from the chamber and passed over an elongated air stream which completely traverses and is directed to impinge upon the bottom surface of the tray. By arranging the lenses in spaced, parallel rows on the tray, a plurality of lenses in each row may be inverted simultaneously by moving the tray over the air stream in a direction generally perpendicular thereto. As each row passes over the air stream, all of the lenses in the row are inverted simultaneously.

More particularly, a quantity of the air stream, which is of a predetermined velocity, distance and angulation with respect to the tray, passes through the perforations in the tray to impinge upon the concave, downwardly facing surfaces of the lenses. The force of the moving air stream against this surface of the lens acts to raise and invert the lens on the tray with its convex side now facing upwardly from the tray. Also, each lens comes to rest in substantially the same location as they were prior to inversion which provides a desirable material handling method for inverting contact lenses in that:

1) the lenses, including the peripheral edges thereof, are not touched by any kind of mechanical handling instrument other than the tray which supports them, thus significantly reducing the chance of lens damage and minimizing scrap ratios;

2) a plurality of lenses may be inverted simultaneously on the same tray;

3) the lenses are inverted to their original positions on the tray facilitating subsequent handling steps; and 4) the inverting method is automated, thus substantially reducing the risk of operator injury.

The tray with inverted lenses now facing concave side-up may then be put back into the plasma chamber for final treatment to this surface of the lens. It will be appreciated that the present inversion apparatus and method may be used in conjunction with processing steps other than plasma treatments which likewise require sequential treatments to the opposite convex and concave surfaces of the lenses.

DETAILED DESCRIPTION OF THE PREFERRED EMBODIMENT

Figure 1:
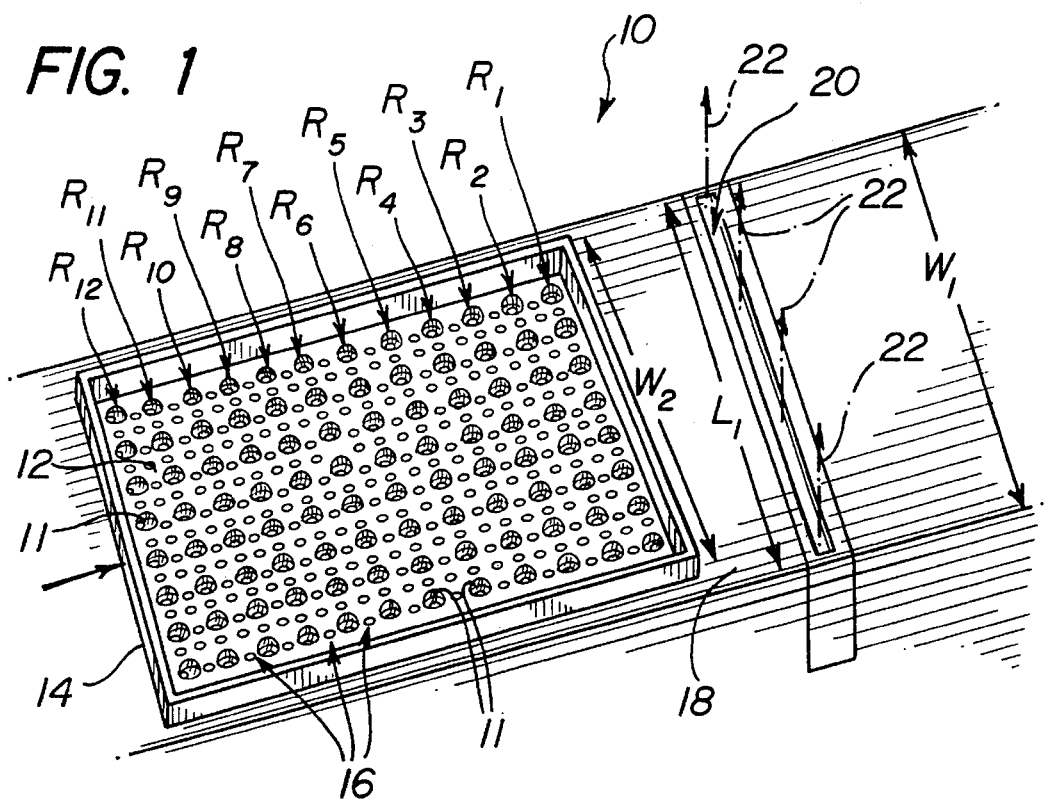
FIG. 1 is a perspective view of a preferred embodiment of the invention wherein spaced rows of contact lenses are supported on a perforated tray convex side-up, subsequent to having been subjected to a first processing step wherein this surface of the lenses has been treated, yet immediately prior to being passed over the elongated air stream emanating from a slot in a table.

Referring now to the drawing, there is seen in the various Figures an article orienting apparatus designated generally by the reference numeral 10 which is used to quickly invert a plurality of contact lenses 11 from a convex side-up position to a convex side-down position. As shown in FIG. 1, lenses 11 are initially placed convex side-up on the upwardly facing horizontal surface 12 of a tray 14 in twelve spaced, parallel rows $R_1$-$R_{12}$ with eight lenses in each row. While it is preferred to arrange the lenses 11 in spaced, parallel rows on tray 14 as shown for reasons discussed below, the number of rows and number of lenses in each row may of course vary as desired. Surface 12 is seen to include a plurality of perforations 16 formed entirely therethrough which are of substantially smaller diameter than any of the lenses 11 so as to provide airflow through surface 12 while also preventing accidental lodgment of a lens in a perforation. Also, it is preferred that perforations 16 are sufficient in both number and spacing on surface 12 so as to ensure that any lens 11 placed on surface 12 will be positioned over at least one, but preferably more than one, of the perforations 16.

It is noted that it is known to use a perforated tray such as tray 14 to support lenses during a manufacturing processing treatment such as treatment in a plasma chamber, for example. In this known process, the lenses are usually inverted manually on the tray between sequential plasma treatments to the opposite convex and concave surfaces of the lenses. The perforations in the tray in this instance are provided merely to provide adequate aeration to the downwardly facing surface of the lenses during treatment and, to the knowledge of Applicant, have not been used in any type of material handling sense such as in the present invention as described and claimed herein.

In FIG. 1, it is understood lenses 11 have undergone the first stage of a two stage processing treatment to the convex (side-up) surfaces of the lenses 11, e.g., a plasma treatment wherein tray 14 and lenses 11 are placed in a conventional plasma chamber (not shown) for a predetermined amount of time. Following removal of tray 14 and lenses 11 from the plasma chamber, tray 14 is placed upon a substantially horizontal surface 18 having a width $W_1$ which is preferably at least as wide as the width $W_2$ of tray 14 to provide an adequate support surface therefor. As seen most deafly in FIGS. 1, 3 and 4, an elongated, recessed slot 20 is formed in and traverses surface 18 and has a length $L_1$ which is substantially equal to or greater than the width $W_2$ of tray 14. As described in detail below, a source of air located below surface 18 directs a controlled stream of air 22 upwardly through slot 20 so as to invert lenses 11 from a convex side-up to a convex side-down position as tray 14 is passed over slot 20 on surface 18 from the left to the right in accordance with the arrow of FIG. 1.

Figure 2:
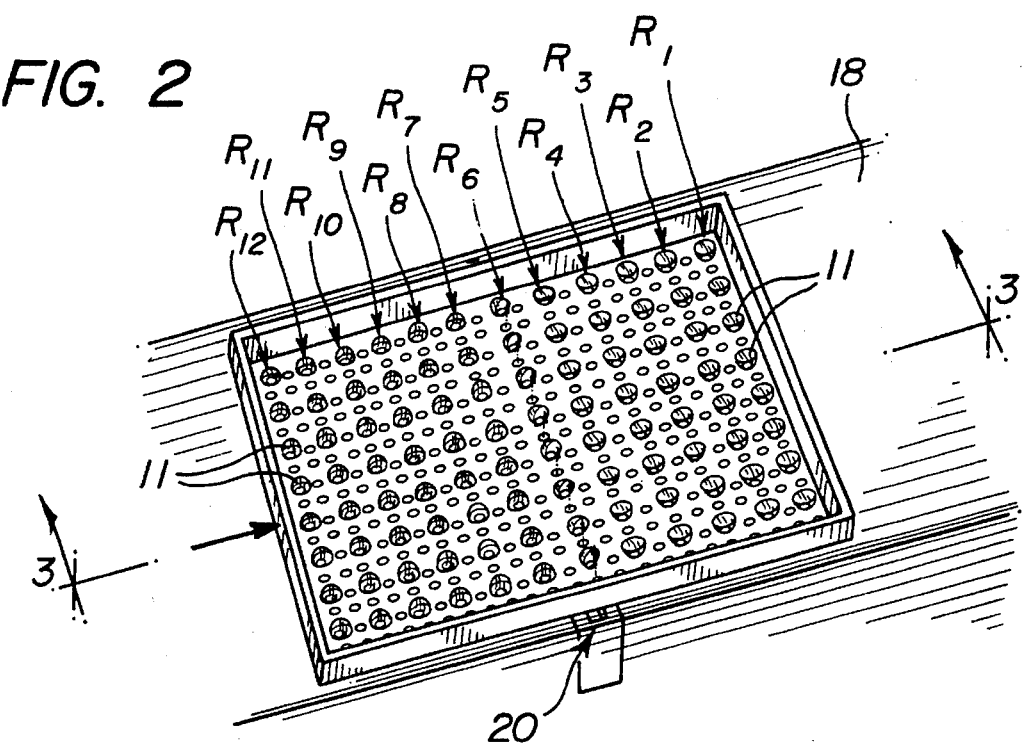
FIG. 2 is the view of FIG. 1 showing the tray as it is being passed over the air stream (in the direction of the arrow) with the first five rows of lenses (counting from the right) having already been passed over and inverted by the air stream, the sixth row in the process of being passed over and inverted by the air stream, and the last six rows still in the initial convex side-up position.
Figure 3:
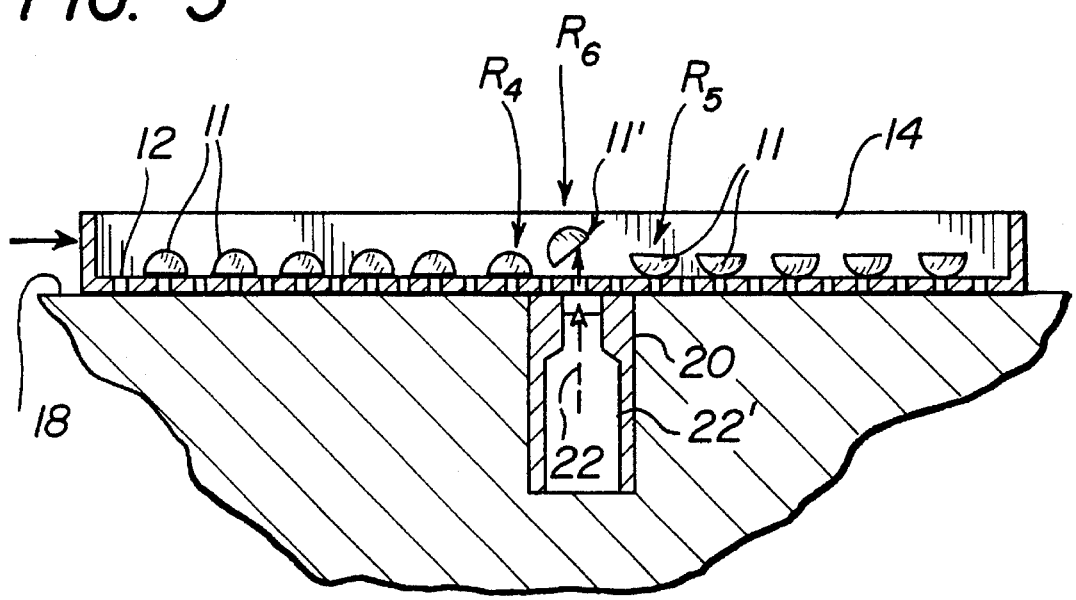
FIG. 3 is a cut-away cross-sectional view as taken along the line 3—3 in FIG. 2 showing the source of the air stream positioned in the recessed slot of the table and a lens of the sixth row in the process of being inverted thereby.
Figure 4:
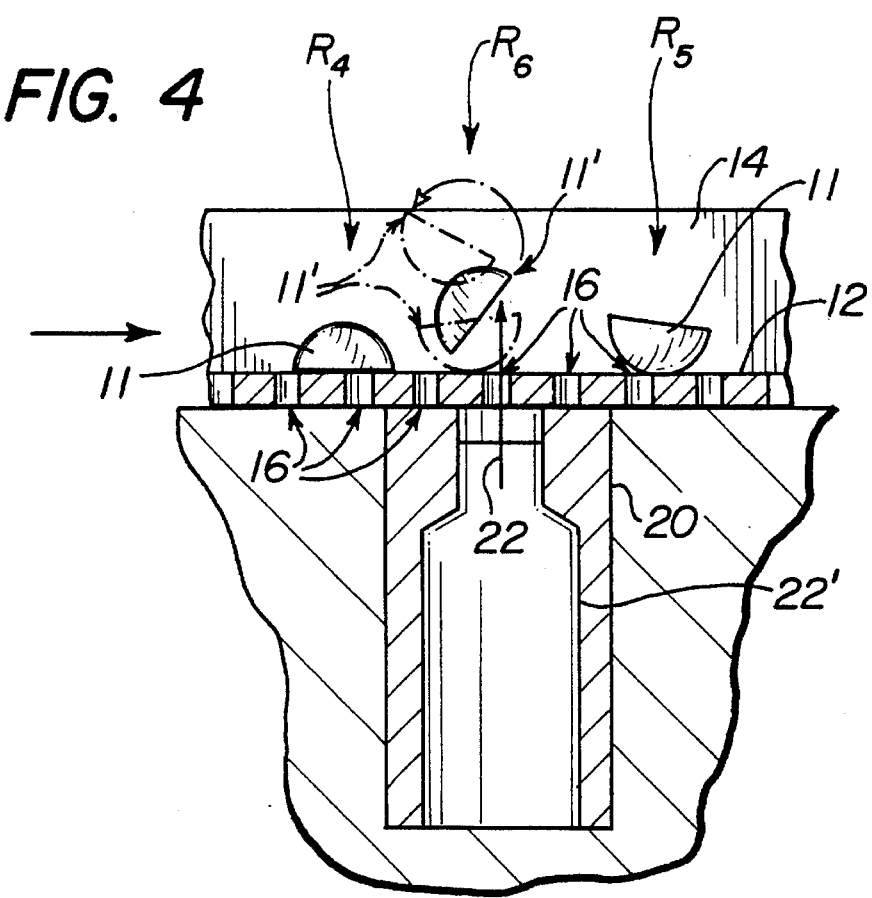
FIG. 4 is an enlarged view of the air stream source in FIG. 3 showing the lens' path of inversion caused by the air stream in phantom lines.

Turning attention to FIGS. 2–4, tray 14 is approximately half-way through the process of being passed over slot 20 wherein air stream source 22' is located. In the Figures, the lenses in the first five rows $R_1$-$R_5$ have already been passed over and inverted to a concave side-up position, lenses in row $R_6$ are in the process of being passed over and inverted by air stream 22, and lenses in rows $R_7$-$R_{12}$ located to the left of the air stream are still in the initially placed convex side-up position. The inversion path a lens takes as it passes over air stream 22 is illustrated in phantom lines in FIG. 4. As seen, the lens 11' in the sixth row $R_6$, which at this point is positioned directly over the air stream 22, is being inverted in the counter-clockwise direction which is opposite to the direction of tray travel. This is so since the leading edge 11' of the lens is the first part of the lens to be impinged by the air stream 22.

As seen in FIG. 1, air stream 22 emanates from substantially the full length $L_1$ of slot 20 such that all of the lenses in a row are inverted simultaneously as the row passes over slot 20. Thus, source 22' is elongated such that it extends substantially the full length of slot 20 to provide an air stream 22 which traverses the full width $W_2$ of tray surface 12. Also, by controlling such parameters as air stream velocity and angulation with respect to the tray surface 12, the lenses may be caused to come to rest in substantially the same position as they were prior to inversion as shown, thus greatly facilitating subsequent material handling steps.

Once the tray 14 has been completely passed over the air stream 22, all lenses 11 are in an inverted, concave side-up position (as seen in rows $R_1$-$R_5$) whereupon this surface may be treated as needed in the second stage of the selected processing treatment.

It may thus be realized that the present invention provides a quick, easy, and reliable apparatus and method for inverting a plurality of contact lenses between sequential processing steps requiring treatments to the opposite concave and convex surfaces of the lenses. While the invention has been described with regard to a preferred embodiment thereof, it will be appreciated to those skilled in the art that various modifications may be made without departing from the full spirit and scope of the invention as is defined by the claims which follow. For example, the method may be more fully automated by utilizing a perforated conveyor belt instead of a tray whereby the lenses, which are initially placed on the belt in a convex side-up position, may enter a first processing station for treatment to this surface of the lenses, exit the first processing station and pass over an air stream which traverses the belt so as to be inverted to a concave side-up position on the belt, and proceed to enter a second processing station for treatment to this surface of the lens.

What is claimed is:

1. Apparatus for inverting a plurality of contact lenses from a convex side-up position to a concave side-up position comprising:

a) a tray having opposite bottom and top surfaces having a common width $W_2$ and including a plurality of perforations formed entirely through said tray from said top surface to said bottom surface, said plurality of contact lenses being positioned on said top surface with each one of said lenses being positioned over at least one of said perforations;

b) a source for directing an air stream of predetermined velocity against said bottom surface of said tray, said air stream passing through said perforations and impinging upon and inverting lenses in said convex side-up position to said concave side-up position; and c) a substantially planar surface for supporting said tray, said planar surface including a recessed slot having a length $L_1$ which is at least as long as said width $W_2$ of said tray, said source being positioned within said slot with said air stream being directed outwardly of said slot toward said planar surface, whereby said tray may be moved across said planar surface over said slot with said air stream traversing and impinging upon said tray bottom surface, passing through said perforations and inverting said lenses as they are passed over said slot.

2. A method of inverting a plurality of contact lenses from a convex side-up position to a concave side-up position, said method comprising the steps of:

a) providing a contact lens support surface for said plurality of lenses, said support surface having opposite top and bottom surfaces with a plurality of perforations formed through said support surface from said top surface to Said bottom surface;

b) placing said plurality of lenses in said convex side-up position on said top surface of said support surface; and c) directing an air stream to impinge against said bottom surface of said support surface whereby said air stream passes through said perforations and inverts said lenses from said convex side-up position to said concave side-up position.

3. The method of claim 2 wherein said support surface includes first and second, opposite side edges and a width $W_2$ measured between said first and second side edges, and wherein said air stream elongated air stream which completely traverses said bottom extends from said first side edge to said second side edge of said support surface, and including the step of passing said support surface over said air stream in a direction substantially perpendicular to the direction of said air stream.

4. The method of claim 2 wherein said lenses are positioned in spaced, parallel rows on said support surface, said air stream acting to simultaneously invert all lenses in a row as said support surface is passed over said air stream.

* * * * *

UNITED STATES PATENT AND TRADEMARK OFFICE
CERTIFICATE OF CORRECTION

PATENT NO. : 5,503,515
DATED : April 2, 1996
INVENTOR(S) : Michael Moorehead

It is certified that error appears in the above-indentified patent and that said Letters Patent is hereby corrected as shown below:

In column 1, lines 63 and 65, change "("skin")" to -- ("skirt") --.

In column 2, line 11, change "an "up skin" position" to -- an "up skirt" position --.

In column 4, line 23, change "deafly" to -- clearly --.

In column 6, line 14, change "Said" to -- said --.

In column 6, line 25, between "$W_2$" and "measured", insert the word -- as --.

In column 6, lines 26-27, delete "elongated air stream which completely traverses said bottom".

Signed and Sealed this

Eighth Day of October, 1996

Attest:

BRUCE LEHMAN

*Attesting Officer*   *Commissioner of Patents and Trademarks*